March 21, 1961 D. B. NICHINSON ET AL 2,975,642
PRECISION TACHOMETER SYSTEM
Filed Nov. 12, 1958 2 Sheets-Sheet 1
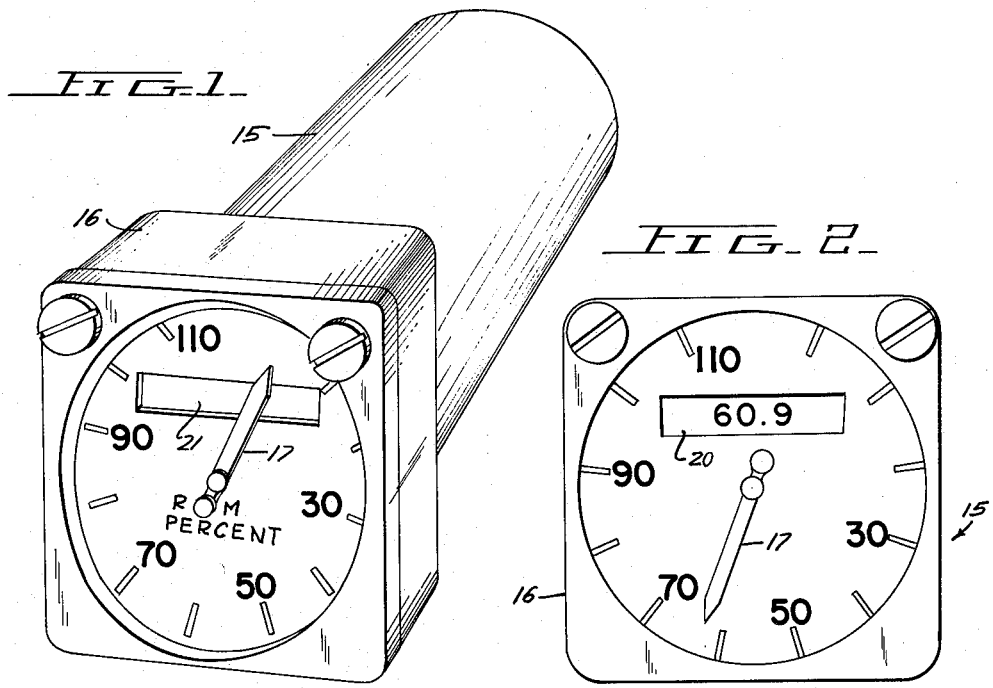
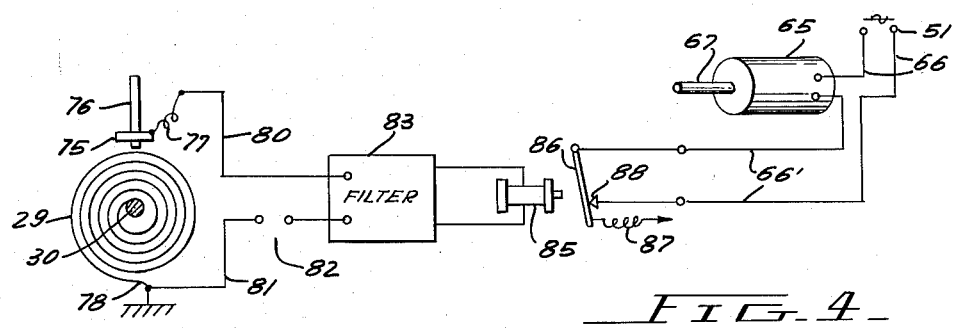
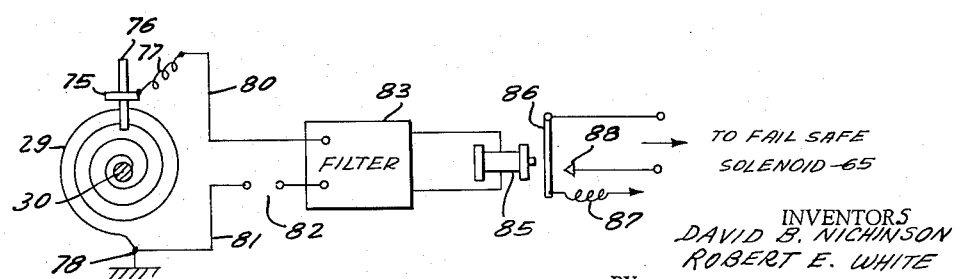
INVENTORS
DAVID B. NICHINSON
ROBERT E. WHITE
BY
ATTORNEYS

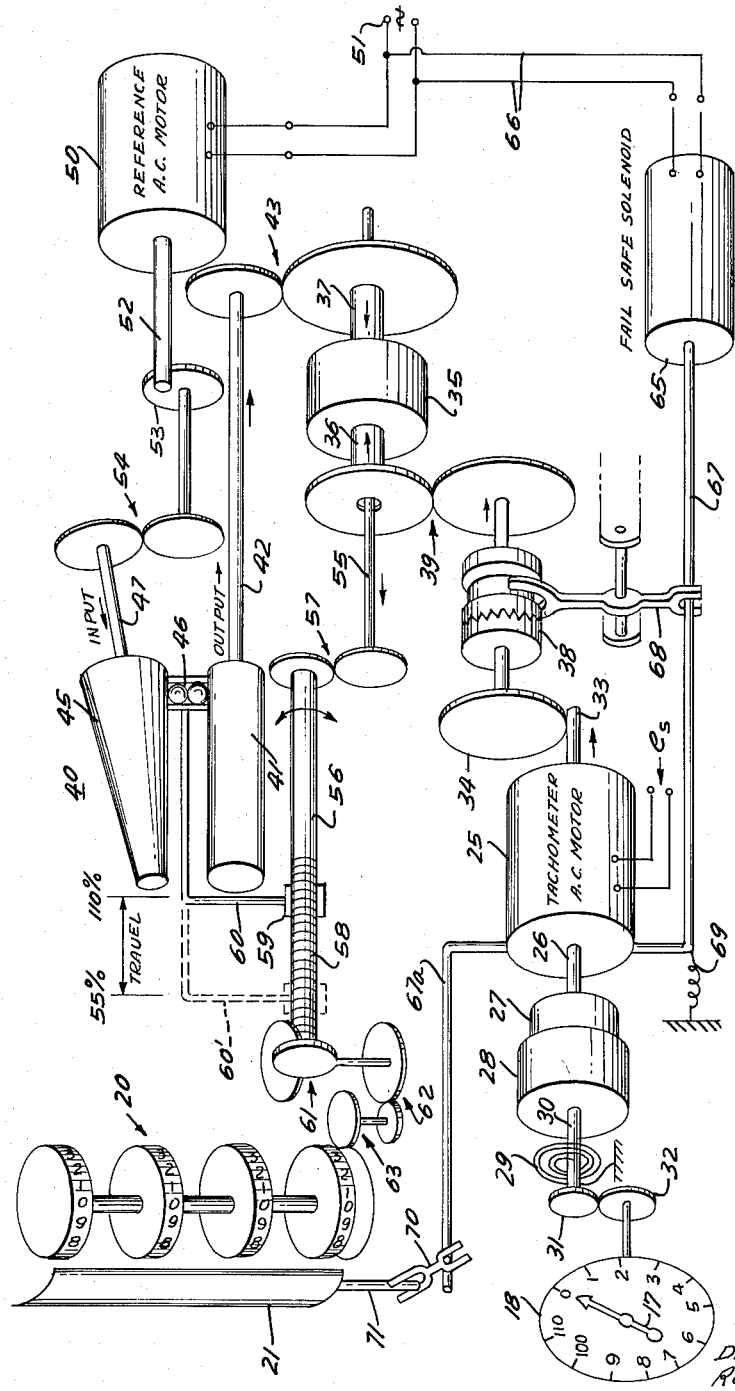

United States Patent Office 2,975,642
Patented Mar. 21, 1961

2,975,642

PRECISION TACHOMETER SYSTEM

David B. Nichinson, Great Neck, and Robert E. White, Westbury, N.Y., assignors to Kollsman Instrument Corporation, Elmhurst, N.Y., a corporation of New York Filed Nov. 12, 1958, Ser. No. 773,445

14 Claims. (Cl. 73—510)

This invention relates to precision speed measuring systems, and more particularly relates to a novel composite dual display tachometer with one indicator having a high order of accuracy.

In accordance with the present invention electrical speed signals are derived from an engine mounted permanent magnet generator. Two independent means are used to present the engine speed. A synchronous tachometer motor of conventional design, utilizing a drag cup, provides a pointer speed display. Its accuracy is of the order of 2% at full scale but is of a substantially higher accuracy for lower scale readings. The other speed display is a digital or counter scale adjacent the pointer and its circular scale. The digital indications are accurate to 0.1% of full scale.

The digital speed indicating mechanism hereof is an important aspect of the present invention. A cone-cylinder integrator is used in combination with differential gearing to effect a displacement of the integrator carriage proportional to the speed reading required. The digital speed readings are effective only from half-speed scale readings to maximum, and are at relatively high accuracy. A shade is used that covers the counter scale at the below 50% scale range. Further, novel fail-safe arrangements are incorporated which automatically decouples the precision speed measuring mechanism from the tachometer system when the former becomes inoperative, to insure at least speed readings by the latter.

It is accordingly a primary object of the present invention to provide a novel composite speed indicator, with one speed display being a precision one.

Another important object of the present invention is to provide a novel precision speed measuring system incorporating a cone-cylinder integrator and differential gearing.

A further object of the present invention is to provide a novel precision speed indicator operable above the 50% speed point, with automatic shuttering of its scale at speeds below 50% thereof.

Still another object of the present invention is to provide a novel fail-safe arrangement for a composite tachometer, automatically disengaging the precision section in order to maintain the basic indications.

A further object of the present invention is to provide a novel precision speed indication system having a direct decimal readout with 0.1% full scale accuracy.

These and other objects of this invention will become more apparent from the following description of an exemplary embodiment thereof, taken in connection with the drawings in which:

Figure 1 is a front perspective illustration of the exemplary dual tachometer indicator.

Figure 2 is a face view of the indicator panel of Figure 1, with a dual reading.

Figure 3 is a schematic illustration of the exemplary composite speed indicating system.

Figures 4 and 5 are schematic diagrams of a control section for the composite indicator of Figure 3.

Figure 1 illustrates the compactness and panel mount type of structure into which the invention system dual indicator may be arranged. The indicator 15 has a square panel housing 16, which in the exemplary form is two inches on a side. The scale is calibrated in percent of rated engine speed from 0% to 110%. The 50% scale point is at the 55% reading. The pointer 17 rotates from the center of the scale, and is actuated by a conventional drag cup tachometer, as will be set forth.

A decimal counter scale 20 is arranged with the circular scale, as seen in Figure 2. A shutter 21 automatically masks scale 20 at below 50% speed readings, in a manner to be described. The pointer 17 has an accuracy of 2% at the 110 full scale reading. The speed for Figure 2 is 60.9 r.p.m. percent as shown on precision counter scale 20. Its 0.1% accuracy of full scale is equivalent to one digit at the decimal position of scale 20. Precision scale 20 is visible for all readings from 55.0 to 110.0 in the exemplary meter 15. Other scale figures are, of course, usable.

The components and their interrelation is shown in the overall schematic illustration, Figure 3. A generator (not shown) is mounted with the rotating body to be measured, to generate a speed signal voltage $e_s$. A synchronous tachometer motor 25 of conventional design connects to voltage signal $e_s$. A two or three phase alternating current interconnection affords accurate speed translation between the remote generator and motor 25. The rotor shaft 26 of tachometer motor 25 has a cylindrical permanent magnet 27 mounted at one side.

A standard type of drag cup 28 coacts with magnet 27, being rotated thereby by eddy current drag against the restraining torque of hairspring 29. The drag cup staff 30 is coupled to pointer 17 by gears 31, 32. Circular dial 18 provides one of the two speed indications, the cruder one, with pointer 17, as described hereinabove in connection with Figures 1 and 2. For clarity of illustration, the counter 20 and counter shade 21 are shown remote from circular dial 18.

A pinion 33 extends from the rotor of tachometer motor 25, meshing with a gear 34. The rotational speed of the rotor of motor 25 is thereby transmitted to an input 36 of a spur gear differential 35. This drive is effected through a normally engaged clutch 38 and gearing 39. The other input 37 to differential 35 is geared to the output of cone-cylinder integrator 40. The input 37 drive is effected from the cylinder 41 output shaft 42 through gearing 43.

Integrator 40 comprises a cone member 45 coextensive with cylinder 41. A ball carriage 46 drives cylinder 41 through cone drive 45. The output speed of integrator 40 is represented by that of cylinder 41, and is proportional to the position of the integrator ball carriage 46. A predetermined precision input speed is applied to the input cone of integrator 40. This is provided by a synchronous motor 50 operating from a precision frequency source (51). The exemplary system used an 8000 r.p.m. motor 50 connected to an accurate 400 cycle 115 volt source (51). The output pinion 52 drives a gear 53, which through gearing 54 applies a synchronous reference speed to input shaft 47 of the integrator 40.

The rotations of the two inputs 36, 37 to differential 35 are such that its output, at its shaft 55, is at a speed proportional to the difference of the tachometer motor 25 speed (at pinion 33), and the integrator 40 output speed (at shaft 42). The output shaft 55 of differential 35 is geared to the lead screw 56 of integrator 40 through gearing 57. Lead screw 56 has a precision line thread worm indicated at 58. A nut 59 coacts with worm 58, and is connected to the integrator ball carriage 46 by link 60.

A differential gear 35 output rotation at its shaft 55 represents a "speed error" for the integrator output shaft 42 speed with respect to that representative of the tachometer motor 25. Such speed error results in a differential output at shaft 55 that in turn motivates lead screw 56. The integrator ball carriage 46 is thereupon displaced in the direction to alter the integrator output speed. The input speed to differential gear 35 at input 37 is correspondingly altered to reduce the differential output speed at shaft 55. This "null" seeking action proceeds directly until a zero "speed error" occurs, and the shaft 55 is stationary. At this condition the two inputs 36, 37 to the differential gear 35 are at equal speed and the ball carriage 46 ceases to move.

The position of the ball carriage 46 is known by the corresponding position of drive nut 59 on lead screw 56. Accordingly, the net number of revolutions of lead screw 56 determines the position of ball carriage 46. The output shaft 42 speed of cone-cylinder integrator 40 is of course directly proportional to the position of the ball carriage 46, in view of the constant precision speed input at 47 from synchronous motor 50.

When the "null" position of ball carriage 46 is reached, the integrator output shaft speed 42, as determined by such "null" position of ball carriage 46, is directly proportional to and precisely corresponds to the synchronous tachometer motor (25) speed, and therefore, to the engine speed being measured. Decimal counter 20 is geared to lead screw 56 to display the engine speed reading, in a suitably calibrated scale, e.g. percent r.p.m. Four-place counter 20 is of conventional construction, and is directly coupled to lead screw 56 through gear sets 61, 62 and 63.

As the net number of revolutions of lead screw 56 corresponds to the ball carriage 46 position, the speed balance or "null" of the invention precision system results in direct speed readings on counter 20, or equivalent display. The relative extreme positions of ball carriage 46 with respect to cone 45 and cylinder 41 are indicated in Figure 2. The solid line position of ball carriage 46 and link 60 is at the top speed readings, namely, 110%. The dotted position 60′ of the link represents the lower speed reading thereof, namely 55% at the half scale point. I have found such range for the precision system hereof as practical. Accordingly, at below the half-speed point the counter 20 is obscured by counter shade 21, and the tachometer motor 25 is decoupled from the precision speed measuring system through clutch 38, as hereinafter described in connection with Figure 4.

The operation of the speed measuring circuit is dependent upon the functioning of the synchronous reference speed motor 50. Should its power source (51) fail, fail-safe means are herein provided to immediately decouple the speed measuring assembly from the tachometer motor 25, while permitting the drag cup tachometer 27, 28 to operate normally. Also, the counter shade 21 is dropped to mask the readings of counter 20. The fail-safe means comprises a solenoid in direct electrical energization by the reference motor 400 cycle source 51, through leads 66. A diode is used to rectify the solenoid operating voltage. The solenoid plunger 67 is arranged to actuate clutch 38 through lever 68 to engage the clutch.

Thus, when the power source 51 is effective, the tachometer motor is coupled to the differential input gearing 39 through gearing 33, 34 and engaged clutch 38. Should the reference 400 cycle power source fail the solenoid is de-energized, and bias spring 69 returns plunger 67 to disengage clutch 38. The differential gear 35 is thereupon decoupled from the tachometer motor 25 while the drag cup indicator system 27, 28 remains operative. An extension 67a of plunger 67 is linked to counter shade 21 through forked member 70 and rod 71 to effect masking of counter 20 during the power 51 failure. Thus, no false readings are presented. When solenoid is energized, shade 21 is "opened" during the over-half speed readings.

As noted hereinabove, the precision speed measuring circuit is used from half speed to maximum speed only. Below the half speed point the counter 20 is obscured by shade 21, and the tachometer motor 25 is decoupled from the speed measuring circuit. The fail-safe solenoid 65 is controlled to effect such operation, as illustrated in Figures 4 and 5. Towards this end the hair spring 29 of the tachometer indicator is employed. The diameter of the hair spring 29 is a function of the speed of tachometer motor 25. An electrical contact 75 is fixed to the frame and is arranged to coact with hair spring 29. Contact 75 is movable along a radial post 76, displaceable by the hair spring 29.

For above half scale speeds, hair spring 29 has a reduced diameter which does not reach the closest position of contact 75, as seen in Figure 4. For below half scale speeds, hair spring 29 connects with contact 75, moving contact 75 radially outwards along post 76 with lower speeds. The center of hair spring 29 is attached to staff 30; its outer end is secured to the tachometer frame. A control circuit is established by connecting a pig-tail lead 77 to contact 75, and connecting to hair spring 29 terminal 78. Leads 80, 81 connect pig-tail 77 and terminal 78. An input circuit to filter 83 is coupled with leads 80, 81 and voltage source 82, obtained from the rectification of the 400 cycle reference motor supply.

The output of electrical filter 83 controls a relay 85 with a normally open armature 86 through bias spring 87. When there is no connection between hair spring 29 and movable contact 75, namely when the engine speeds are at above half scales, as indicated in Figure 4, no control energization is effective on relay 85. Armature 86 is thereupon closed on fixed back-contact 88. The reference 400 cycle source (51) remains connected to fail-safe solenoid 65 through leads 66′ in series with the relay contacts 86, 88. In such energized condition of solenoid 65, the precision speed measuring system is coupled to tachometer motor 25 through clutch 38, and the counter is unmasked.

When the engine speed is below half scale, the hair spring 29 diameter increases and is in electrical connection with contact 75, as illustrated in Figure 5. The battery 82 circuit to filter 83 is completed, and relay 85 is energized through filter 83. With relay 85 energized, armature 86 opens its circuit at back-contact 88 to fail-safe solenoid 65. Solenoid 65 is accordingly kept de-energized while the speeds to be measured are below half speed. Clutch 38 decouples the precision speed measuring system, and the shade 21 is held in masking relation.

At about the half-speed point the pressure between the hair spring 29 and contact 75 is light. The electrical connection therebetween is accordingly intermittent under vibration. The electrical filter 83 is therefore used in this circuit to prevent the relay 85 and solenoid 65 to chatter. The filter network 83 is proportioned to prevent the relay 85 from responding to circuit interruptions at contact 75 of less than one-tenth of one second in duration.

Although we have set forth the principles and features of our invention in connection with an exemplary embodiment thereof, it is to be understood that modifications may be made therein without departing from its broader spirit and scope, as defined in the following claims.

We claim:

1. In combination, a first tachometer means, a second tachometer means, and an indicator; said indicator comprising a first indicator means and a second indicator means operatively connected to said first tachometer means and said second tachometer means respectively; said first tachometer means having a lower accuracy than said second tachometer in a given indicator range; and a shade means; said shade means being operable to mask said first indicator means when said first indicator means is in at least a portion of said given range.

2. In combination, a first tachometer means, a second tachometer means, and an indicator; said indicator comprising a first indicator means and a second indicator means operatively connected to said first tachometer means and said second tachometer means respectively; said first tachometer means having a lower accuracy than said second tachometer in a given indicator range; and a shade means; said shade means being operable to mask said first indicator means when said first indicator means is in at least a portion of said given range; said first indicator means comprising a decimal counter; said second indicator means comprising a rotatable radial pointer.

3. In combination, a first tachometer means, a second tachometer means, and an indicator; said indicator comprising a first indicator means and a second indicator means operatively connected to said first tachometer means and said second tachometer means respectively; said first tachometer means having a lower accuracy than said second tachometer in a given indicator range; and a shade means; said shade means being operable to mask said first indicator means when said first indicator means is in at least a portion of said given range; said shade means being further operative to mask said first indicator means when said first tachometer means is rendered inoperative.

4. In combination, a first tachometer means, a second tachometer means, and an indicator; said indicator comprising a first indicator means and a second indicator means operatively connected to said first tachometer means and said second tachometer means respectively; said first tachometer means having a lower accuracy than said second tachometer in a given indicator range; and a shade means; said shade means being operable to mask said first indicator means when said first indicator means is in at least a portion of said given range; said indicator comprising a dial; said first indicator means comprising a counter indicator arranged behind said dial and observable therethrough; said second indicator comprising a pointer rotatable with respect to said dial.

5. In combination, a first tachometer means, a second tachometer means, and an indicator; said indicator comprising a first indicator means and a second indicator means operatively connected to said first tachometer means and said second tachometer means respectively; said first tachometer means having a lower accuracy than said second tachometer in a given indicator range; and a shade means; said shade means being operable to mask said first indicator means when said first indicator means is in at least a portion of said given range; said second tachometer means including a drag-cup operatively coupled to said second indicator means; a biasing spring; said drag-cup being biased to a predetermined position by said biasing spring; and circuit means operable responsive to the position of said biasing spring for operating said shade means to a masking position with respect to said first indicator means.

6. In combination, a first tachometer means, a second tachometer means, and an indicator; said indicator comprising a first indicator means and a second indicator means operatively connected to said first tachometer means and said second tachometer means respectively; said first tachometer means having a lower accuracy than said second tachometer in a given indicator range; and a shade means; said shade means being operable to mask said first indicator means when said first indicator means is in at least a portion of said given range; said first tachometer means including a speed measuring system comprising a reference speed source differential drive means with one input responsive to the speed to be measured, variable speed means with its input coupled to said reference speed source, a second input of said differential drive means being coupled to the speed means output, mechanism coupled to the output of said differential drive means for altering the output speed of said speed means in the direction to produce zero speed output at said differential drive means, said second indicator means being coupled to said mechanism for presenting readings of the speed to be measured.

7. In combination, a first tachometer means, a second tachometer means, and an indicator; said indicator comprising a first indicator means and a second indicator means operatively connected to said first tachometer means and said second tachometer means respectively; said first tachometer means having a lower accuracy than said second tachometer in a given indicator range; and a shade means; said shade means being operable to mask said first indicator means when said first indicator means is in at least a portion of said given range; said first tachometer means including a precision speed measuring system comprising a reference speed source, differential gear means with one input responsive to the speed to be measured, a cone-cylinder integrator speed means with its input coupled to said reference speed source, a second input of said differential gear means being coupled to the speed means output, mechanism coupled to the output of said differential gear means for altering the output speed of said speed means in the direction to produce zero speed output at said differential gear means, said first indicator means being coupled to said mechanism for presenting readings of the speed to be measured when the differential gear means output stabilizes at zero speed.

8. A speed measuring system as claimed in claim 6, in which the mechanism includes a lead screw geared between the differential output and the indicator.

9. A speed measuring system as claimed in claim 7, in which the mechanism includes a lead screw geared between the differential output and the indicator, a ball-carriage between the cone and cylinder of the integrator and linkage connecting the ball-carriage in driving relation with the lead screw.

10. In combination, a first tachometer means, a second tachometer means, and an indicator; said indicator comprising a first indicator means and a second indicator means operatively connected to said first tachometer means and said second tachometer means respectively; said first tachometer means having a lower accuracy than said second tachometer in a given indicator range; and a shade means; said shade means being operable to mask said first indicator means when said first indicator means is in at least a portion of said given range; said first tachometer means including a speed measuring system comprising a reference speed source differential drive means with one input responsive to the speed to be measured, variable speed means with its input coupled to said reference speed source, a second input of said differential drive means being coupled to the speed means output, mechanism coupled to the output of said differential drive means for altering the output speed of said speed means in the direction to produce zero speed output at said differential drive means, said second indicator means being coupled to said mechanism for presenting readings of the speed to be measured; and fail-safe means operable responsive to said reference speed source and connected to said shade for masking said first indicator upon failure of said reference speed source.

11. A speed measuring system as claimed in claim 7 in which the mechanism includes a lead screw geared between the differential output and the indicator, a ball-carriage between the cone and cylinder of the integrator and linkage connecting the ball-carriage in driving relation with the lead screw; and fail-safe means operable responsive to said reference speed source and connected to said shade for masking said first indicator upon failure of said reference speed source.

12. A speed measuring system as claimed in claim 6, further including a tachometer motor operated in accordance with the speed to be measured, a clutch coupling said motor to said one input of the differential means, a tachometer read-out actuated by said tachometer motor, and fail-safe means responsive to said speed source for actuating said clutch to decouple the motor and differential means upon failure of the speed source and thereby maintain operativeness of said tachometer read-out.

13. A speed measuring system as claimed in claim 7, further including a synchronous tachometer motor operated in accordance with the speed to be measured, a clutch coupling said motor to said one input of the differential means, a tachometer read-out actuated by said tachometer motor, and fail-safe means responsive to said speed source for actuating said clutch to decouple the motor and differential means upon failure of the speed source, and thereby maintain operativeness of said tachometer read-out.

14. A speed measuring system as claimed in claim 12, further including a lead screw geared between the differential output and the indicator, said fail-safe means being further operative to mask said first indicator means upon failure of said source.

References Cited in the file of this patent

UNITED STATES PATENTS

| | | | |
|---|---|---|---|
| 789,446 | Parcelle | May 9, | 1905 |
| 873,754 | Johnson | Dec. 17, | 1907 |
| 1,209,608 | Moeller et al. | Dec. 19, | 1916 |
| 1,717,687 | Howard | June 18, | 1929 |
| 2,089,878 | Corbin | Aug. 10, | 1937 |
| 2,329,216 | Peters | Sept. 14, | 1943 |
| 2,476,269 | Blackman | July 19, | 1949 |
| 2,511,104 | Eddy | June 13, | 1950 |